Jan. 16, 1940.   W. S. CALCOTT ET AL   2,187,146
PROCESS OF COAGULATION
Filed Oct. 24, 1936
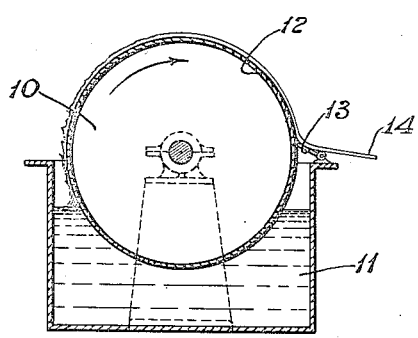
William S. Calcott
Howard W. Starkweather   INVENTORS
BY
Mack H. Clayton   ATTORNEY Patented Jan. 16, 1940

2,187,146

UNITED STATES PATENT OFFICE 2,187,146

PROCESS OF COAGULATION

William Stansfield Calcott, Woodstown, N. J., and Howard Warner Starkweather, New Castle County, Del., assignors to E. I. du Pont de Nemours & Company, Wilmington, Del., a corporation of Delaware Application October 24, 1936, Serial No. 107,332

4 Claims. (Cl. 18—57)

This invention relates to the coagulation of dispersions. More particularly, it relates to the coagulation of latex-like dispersions of polymeric substances such as synthetic rubber. Still more particularly, it relates to the coagulation of aqueous dispersions of plastic polymers of chloro-2-butadiene-1,3.

It is known that both natural and synthetic rubber latex may be coagulated by prolonged exposure to temperatures of $-10°$ C. or below. As compared with methods already known to the art, such as coagulation by the addition of acids, salts, or alcohols, this method has the following advantages. No foreign materials which must afterwards be removed are added and the emulsifying agent used in preparing the latex is easily removed from the coagulum and recovered for reuse. On the other hand, the method has the serious disadvantage that long periods of time are required for complete coagulation.

It is an object of this invention to provide an improved method of coagulating dispersions of polymeric substances, such as synthetic rubber obtainable by polymerizing halogen-2-butadienes-1,3. It is a more specific object to provide a new method for coagulating aqueous dispersions of polymers of chloro-2-butadiene-1,3, particularly plastic polymers. It is a still further object to provide a method by which dispersions of rubber-like polymers of halogen-2-butadienes-1,3, particularly chloro-2-butadiene-1,3, plastic polymers may be rapidly and economically coagulated. Another object is to provide a method for coagulating these polymers which is rapid and economical but which does not involve the introduction of any foreign material. Still another object is to provide a method for coagulating dispersions of these polymers, which yields a coagulum which is very readily washed and purified. Other objects will appear hereinafter.

It has now been found that these objects may be accomplished by converting an aqueous dispersion of a polymer of a halogen-2-butadiene-1,3 into a frozen shape of which at least one dimension is very small, being for example, of the order of about 0.1 inch or less and then maintaining the frozen shape below its freezing temperature for a further period after which the frozen shape is brought above the freezing temperature to melt the ice. Unexpectedly it is necessary to retain the frozen shape at freezing temperature for an appreciable period after its formation in order to ensure complete coagulation. The solid phase is then readily separated from the aqueous phase. Preferably a thin frozen layer of the dispersion is formed by dipping into a dispersion, as described, an object whose temperature is sufficiently low to freeze the dispersion and holding the object in the dispersion, for a sufficient time to form on it the desired thin layer. This object is then removed from the disperson while maintaining it at freezing temperature and is retained at freezing temperature for a short period after its removal. Thereafter, the thin layer is warmed to melt the ice, whereby the coagulum is obtained. A preferred modification involves the coagulation of aqueous dispersions of polymers of chloro-2-butadiene-1,3, particularly its plastic polymers, by the method described. A particularly efficient modification of this process consists in effecting coagulation by this method in such a way that it is continuous.

In order that the invention may be better understood reference is made to the accompanying drawing which represents in section a device 10 of the type commonly employed as a drum dryer dipped into a body of a dispersion of a chloro-2-butadiene-1,3 polymer 11. On the surface of the drum between the point where it leaves the body of dispersion and the doctor knife 13 a thin frozen layer of dispersion 12 is shown. This thin frozen layer is scraped from the surface of the drum by the doctor knife 13 in the form of a thin strong porous continuous strip 14, which is thereafter subjected to thawing, washing, and drying treatments to isolate the polymer. In the operation of the device a cooling medium is circulated inside the drum instead of the heating medium employed when it is operating as a drum dryer. The drum is also insulated on the ends to prevent freezing thereon. It is dipped into the body of dispersion to such an extent and rotated at such a speed as to permit the formation of a layer of frozen dispersion of a suitable thickness on the surface of the drum before it leaves the body of dispersion and to permit this frozen layer to continue at freezing temperature for a time sufficient to complete the coagulation before it is stripped off the drum by the doctor knife 13.

The drawing illustrates one of the many methods by which the present invention may be carried out. The particular device illustrated is adapted to continuous coagulation. Other devices may be employed for continuous coagulation, however, or devices may be employed in which the coagulation is effected in batches. The many variations which are within the scope of the present invention will become apparent from the further description of the invention which appears hereinafter.

It has been also been found that it is possible to coagulate dispersions of polymers of halogen-2-butadienes-1,3, for example, a dispersion of a plastic polymer of chloro-2-butadiene-1,3, by freezing a mass of the dispersion having three large dimensions of the same general order of magnitude, for example, a block, providing the freezing is continued for a sufficient length of time. This method, for convenience called "mass freezing", although possessing advantages over some other methods of coagulation, which are similar to those possessed by methods involving freezing in thin layers, threads, etc., lacks among others, one outstanding advantage of the latter method, i. e., rapidity of coagulation.

In order to more fully illustrate the invention, the following examples are included. It is to be understood that they are not to be construed as limiting the scope of the invention. In them and, in fact, throughout the specification and claims, wherever the term "parts" is used it is intended to mean "parts by weight" and wherever degrees of temperature are specified they are to be understood to be degrees centigrade unless otherwise specifically indicated.

*Example I*

A cylindrical vessel made of Monel metal was partly filled with dichloro-tetrafluoro-ethane which was refluxed at a pressure of 346 mm. of mercury, thus maintaining the temperature of the cylinder at —15° C. The cylinder was then immersed in a latex which had been cooled to between 2 and 5° C. The latex was prepared according to the method described in copending applications of Starkweather and Collins, Serial No. 69,738, filed March 19, 1936, and of Walker, Serial No. 154,212, filed July 17, 1937, by emulsifying 100 parts of chloroprene in 400 parts of a 1% solution of the sodium salt of sulfated oleyl acetate containing 0.75 part of thioglycolic acid and 0.06 part of hydrogen sulphide, polymerizing until the density of the dispersion (at 26° C.) was 1.029 and adding one part of tetra-methyl thiuram disulphide and one part of phenyl-beta-naphthylamine.

After immersion for 10 seconds in the latex, the cooling vessel and the adhering layer of frozen latex (approx. 0.023 in. thick) were removed from the liquid latex and after an additional 20 seconds the frozen layer was removed from the cooling cylinder and warmed to melt the ice. The layer of latex was completely converted by this process to a soft coagulum from which most of the emulsifying solution was readily removed in the form of a clear serum by the application of gentle pressure. After drying, preferably in a current of warm air, the material was ready for milling, incorporation of compounding ingredients, molding and curing.

*Example II*

Results like that obtained in Example I were also obtained when the same method of coagulation was applied to a latex made as in Example I but with:

(a) A 1% solution of the sodium salt of sulfated stearyl alcohol as emulsifying agent.

(b) A 1% solution of the sodium salt of sulfated mixed cetyl and stearyl alcohols as emulsifying agent.

(c) A 1% solution of the sodium salt of sulfonated abietene as emulsifying agent.

(d) 1% of thiophenol (based on the chloroprene) in place of thioglycolic acid and hydrogen sulfide.

(e) 4% of sulfur dioxide (based on the chloroprene) instead of thioglycolic acid and hydrogen sulfide.

All of these coagulated completely in a total of 30 seconds at —15° including the 10 seconds initial freezing period.

Complete coagulation was also obtained, although somewhat more slowly, in the following examples:

(f) A latex made according to the method described in a copending application of Starkweather, Serial No. 69,739, filed March 19, 1936, by polymerizing 100 parts chloroprene containing 4 parts of sulfur dioxide after emulsification in 400 parts of a 2% solution of cetyl trimethyl ammonium bromide. This behaved exactly as the latices described in the preceding part of this example except that 30 seconds exposure to —15° after an initial freezing period of 10 seconds was required for complete coagulation.

(g) A latex prepared as in Example I of this application except that a 1% solution of a sodium salt of sulfonated oleyl alcohol was used as emulsifying agent behaved similarly except that a total of 45 seconds was required for complete coagulation.

(h) A latex made as in Example I of this application except that a 2% solution of cetyl trimethyl ammonium bromide was used as emulsifying agent coagulated considerably more slowly, a total of 15 minutes being required for complete coagulation.

*Example III*

Coagulation is accelerated by using a lower temperature.

(a) Thus the latex of Example II (h) above was treated by the method of Example I, except that the temperature of the cooling cylinder was kept at —30° by maintaining a pressure of 170 mm. The layer of frozen latex (approx. 0.023 in. thick) formed by 2 seconds immersion was completely coagulated in 1 minute as compared with 15 minutes at —15°.

(b) An alkaline latex made according to Example 4 of U. S. Patent 1,967,861 by polymerizing 50 parts of chloroprene emulsified in 50 parts of a 2% solution of sodium oleate and adding ammonium hydroxide was completely coagulated as above by keeping a layer, formed by 2 seconds immersion, for an additional 2 minutes at —30°.

*Example IV*

The process of coagulation in thin layers at low temperature may be carried out continuously as follows: A hollow steel cylinder, 24 in. in diameter, 7 in. wide, was kept at —8° by internally circulating brine. It was rotated about a horizontal axis with a peripheral speed of 6 ft. per minute and dipped to the depth of 7 in. into a reservoir of cooled latex maintained at constant level. The latex used was the same as described in Example I. The latex was prevented from freezing upon the ends of the cylinder by covering them with an insulating layer.

A thin layer of frozen latex was thus formed upon the outer curved surface of the cylinder and maintained at low temperature after its removal from the latex and until it had traveled to a point 11 in. from where the freezing surface re-entered the liquid latex. It was continuously removed at this point by means of a knife which made an angle of approximately 45° with the surface of the cylinder and which was maintained in contact with it by means of a spring or weight. The stripped layer of frozen latex, which remained unbroken, was received upon a belt moving at the same speed as the outer curved surface of the cylinder.

The frozen coagulum was thawed by bringing it into contact with warm water while still supported on the belt. The emulsifying solution was then largely removed from the coagulum in the form of a clear serum by squeezing the coagulum between rolls. The coagulum still supported on the belt was further washed by passing it through a bath of ethanol, after which it was dried by passing it on the belt through a chamber through which a current of warm air was flowing. However, more efficient washing is obtained as disclosed hereinafter by treating the film with ethanol before passing it between the squeeze rolls.

It can be readily calculated that under the particular set of operating conditions existing in this example the latex was frozen for approximately 22 seconds in contact with the liquid phase and was then kept at approximately −8° out of contact with the liquid latex for an additional 31 seconds. Under these conditions 30–40 lbs. of latex were coagulated per hour. Several days would be required for the coagulation of this weight of latex in one mass.

It will be seen from these examples that this invention may be carried out using many different types of latices, operating conditions and procedures. Thus, an aqueous dispersion of a rubber-like polymer of a halogen-2-butadiene-1,3 may be used, irrespective of the type or quantity of dispersing agent used. The dispersing agent may be a salt of a fatty acid, a salt of a nitrogen base, or a salt of a sulfated hydroxyl compound or of a sulfonated hydrocarbon and wide variation within these classes is also possible as illustrated above. The polymerized halogen-2-butadiene-1,3 likewise need not be polymerized chloroprene. Aqueous dispersions of polymers of bromo-2-butadiene-1,3 may thus be coagulated by the method of this invention.

Furthermore, the polymerization leading to the formation of latices suitable for coagulation by this method may be carried out in general by any of the methods known to the art for controlling or modifying the polymerization or the nature of the polymers, including as in the above examples polymerization in the presence of modifying agents such as sulfur dioxide, thiophenol, thioglycolic acid, hydrogen sulfide and the like as described in copending applications of Starkweather, Serial No. 69,739, filed March 19, 1936; Starkweather and Collins, Serial No. 69,737, filed March 19, 1936; Starkweather and Collins, Serial No. 69,738, filed March 19, 1936; and Youker, Serial No. 204,362, filed April 26, 1938. The Youker application was refiled March 28, 1939, Serial No. 264,581. The latex may have incorporated in it, prior to coagulation, antioxidants and preserving agents, compounding ingredients, etc. and also compounds designed to maintain the polymer in plastic condition as described in copending applications of Starkweather and Collins, Serial No. 196,186, filed March 16, 1938; and Walker, Serial Nos. 69,740 and 154,212, filed respectively on March 19, 1936, and July 17, 1937. Solvents such as benzene, which are sometimes used to assist in the incorporation of these agents, are without effect upon the coagulation. Latices in which polymerization has been carried to completion as well as those in which polymerization is incomplete and in which a certain quantity of unchanged polymerizable material exists may be used.

Latex of any concentration may be used, provided that it is sufficiently fluid. The rate of coagulation is practically independent of concentration. The latex may be alkaline, neutral or acid, although in many cases a much more rapid coagulation is obtained with acid latices. Thus the latex of Example II (f), which when acid coagulated in a total of 40 seconds required 13 minutes when neutralized with ammonia. Similarly the latex of Example II (g), which coagulated in 40 seconds when acid, required 3 minutes when alkaline with ammonium hydroxide. In all cases, however, complete coagulation was obtained with even the alkaline latices in a much shorter time than is required for coagulation by freezing by the older methods.

The process may be operated at any temperature below approximately −5° C., which is the point, varying somewhat with the individual latex, above which coagulation does not occur or occurs at an impractically slow rate. Preferably, however, dispersions of plastic polymers of chloroprene will be frozen at temperatures ranging from about −8° to about −30° C.

The lower the temperature, the greater is the rate of coagulation. Thus, as illustrated above in Examples II (h) and III (a), a layer of latex which required 15 minutes for coagulation at −15° required only 1 minute at −30°. Lowering the temperature also increases the rate of formation of the frozen shape of latex, as illustrated in the following table, which also shows that the thickness of frozen layers of latex formed on a freezing surface increases, although not linearly, with the time of contact.

| Time of contact, seconds | Thickness— | |
|---|---|---|
| | At −30° | At −15° |
| | Inch | Inch |
| 1 | 0.019 | |
| 2 | .023 | |
| 5 | .036 | |
| 10 | .048 | 0.023 |
| 20 | .068 | .038 |
| 40 | | .062 |

The thickness of the frozen layer may thus be varied over a wide range by varying either the temperature or the time of contact. The thicker the layer or other shape, however, the longer, in general, is the time required for complete coagulation since, as shown above, the frozen shape grows more slowly the thicker it becomes. It will usually be found that, when a very thick layer is formed, the total time required for coagulation is uneconomically long, and that, when a very thin layer is formed, the rate at which the coagulated polymer is produced is too small. A layer or other shape of some intermediate thickness will therefore be found to give the most economical operating conditions and in addition will be found to be more readily subjected to further processing after coagulation. This thickness may be determined experimentally for any given latex, cylinder dimensions, operating temperature, etc., by application of the principles discussed above bearing in mind also facility in washing, drying, etc., discussed more fully hereinafter.

In general, it may be said, however, that the frozen shape should have at least one dimension which is of the order of about 0.1 inch or less in order to obtain the advantages of rapid coagulation and facility in processing the coagulum. Thus the frozen shape need not be a layer but may be, for example, a thread or band or strip or droplet so long as at least one dimension is not substantially greater than about 0.1 inch. Obviously, more than one dimension may be of this latter order, if desired, as is more fully pointed out below.

Generally, it is most convenient to freeze the dispersions in the form of thin sheets by exposing the dispersion to a suitably cooled surface and the invention is discussed largely with reference to this modification but it is sometimes advantageous to freeze in other forms by other means. Thus the dispersion may be extruded through a nozzle into a refrigerated bath of a liquid, such as mercury, which does not dissolve either phase of the dispersion, or it may be broken into a spray by means of a jet of gas under such conditions, for example, rapid decrease in pressure, that the material is reduced to the required low temperature and is frozen. These methods are readily adapted to continuous operation and are, in general, susceptible to being modified in much the same way as the methods described herein in more detail.

The period of time during which the freezing surface is to remain in contact with the body of latex is determined, as is apparent from the above, by the thickness of the layer or other shape of frozen latex which it is desired to form. The length of time during which this frozen latex will be kept in contact with the freezing surface after the desired thickness of film or thread, etc., has been formed will vary not only with the ingredients present in the latex but also with the temperature employed. Lower temperatures not only form the frozen shapes more rapidly but also bring about coagulation more rapidly after the shape has been formed, as shown above. Typical periods of time sufficient to permit the completion of the coagulation of the latex in contact with the freezing surface after its removal from the body of latex are given above. The time required under a given set of conditions may be readily determined by applying the principles illustrated in the above specific examples. It is obvious that in the continuous modification of the invention, illustrated by Example IV, the time of forming the shape by freezing and the total time during which the frozen latex is in contact with the cylinder each may be varied by varying the rate of rotation, the point at which the frozen layer is removed, and the depth to which the cylinder dips into the liquid latex. It should also be noted, although this invention is discussed largely with reference to formation of the frozen shapes by holding a freezing surface in contact with a body of latex, that the invention is not so limited and that other methods for forming the frozen shape may be employed. For example, the frozen shape may be formed by spreading a thin film of latex on a freezing surface or in the other ways mentioned below.

As may be implied from the above description, the continuous method of coagulation by freezing is susceptible of being varied in much the same manner as has been described in some detail in the broad discussion. It should be borne in mind, however, that the invention is particularly applicable to the coagulation of latices of chloroprene polymer, which phase of the invention is accordingly a preferred embodiment of the continuous as well as of the discontinuous method.

With further reference to the continuous method, it is pointed out that the dimensions of the apparatus are not critical to the invention. Any reasonable variations may be made in the specific apparatus described and in fact, other types of apparatus adapted to effect coagulation by the general method disclosed herein may be used. By "reasonable" is meant any which are not impossible or highly impracticable from an engineering standpoint. Any desired cooling means may be used. It is preferable for reasons which are obvious that the ends of the cylinder be insulated to prevent freezing on the ends. The cylinder and other parts of the apparatus may be constructed of other materials than those described in Example IV. Similar apparatus is known in the art. It has been used, heretofore, for flaking various substances and its general variations will be apparent from this prior art.

After the frozen shape has been retained at freezing temperature for a suitable period as indicated above, it is warmed to melt the ice. The frozen shape may be allowed to stand at any temperature above its freezing point, for example, room temperature, or the melting of the ice may be accelerated by placing the frozen shape in a warm place or bringing it into contact with a suitable heated substance. Thus it may be brought into contact with warm water and/or with the recovered emulsifying solution and/or with the solvents mentioned below. These modifications have given satisfactory results but it is not intended that the invention shall be limited to any particular method for melting the frozen shape.

The washing of the coagulum and its further treatment do not differ materially from methods described for coagula of synthetic rubber, particularly chloroprene polymer, obtainable by other methods of coagulation. Any desired means for washing the coagulum may be employed, including solvents, such as water, alcohol and acetone which dissolve the emulsifying agent but not the polymer. In fact, the frozen shape may be thawed and washed to remove the emulsifying solution in one bath if desired. The washing media are the same as those previously described and, in general, all such are suitable. It will be observed as illustrated in the examples that a large portion of the dispersing medium, emulsifying agent, etc. may be removed from the polymer by applying pressure, for example, with the hands or by passing the coagulum through squeeze rolls but preferably this is not done until after the coagulum has been washed since the pressure tends to destroy the peculiarly porous condition of the films obtained by this process, which so greatly facilitates their washing.

The coagulum from which the emulsifying solution has been largely removed by any of the above methods is then dried, preferably in a current of warm air but drying, milling, compounding, etc. of the polymer after coagulation do not require any particular discussion. Prior art methods require little or no variation.

In connection with the washing step, it is further pointed out that where the coagulum is washed with solvents, such as alcohol, which are solvents for certain of the somewhat odorous impurities present with the rubber-like polymers, many of these impurities are removed, at least in part, with the result that a more odorless polymer is obtained. The monomer, for example, has a distinct odor and some of it is usually present with the polymer in the coagulum but since it is soluble in many solvents such as alcohol, the amount of it present in the polymer is materially decreased by the alcohol wash. The removal of impurities from the polymer by washing with selective solvents is known, however, and need not be further discussed herein. It is frequently desirable to subject the coagulum to a bath of such a selective solvent even though it is also washed with water.

As is apparent from Example IV, the continuous method is especially advantageous in that it is not only possible to freeze the shape continuously but also to thaw, wash and dry the frozen shape continuously. The frozen shape, when ready for thawing, can be received on a belt and continuously thawed, washed and dried by passing the belt with the frozen shape or coagulum on it through any suitable series of baths, heated chambers, etc. It is also possible to include squeeze rolls in this series but ordinarily the coagulum is separated from the belt when passing it through such rolls, the belt being passed under the rolls. The coagulum may be received again on a belt as it comes from the rolls and passed through further baths, etc., if desired. Satisfactory results have been obtained by spraying the washing media, etc., upon the frozen shape or coagulum as well as by passing it through baths, particularly where the washing, etc., is carried out continuously.

Several of the copending applications, identified above, describe continuous formation of plastic chloroprene polymers combined with continuous stabilization of such polymers. The present invention may be combined with these continuous processes to provide a process in which, for example, chloroprene is continuously emulsified, polymerized, stabilized, coagulated, washed and dried.

As illustrated above, this invention furnishes a method for obtaining rubber-like materials (which are derived from halogen-2-butadienes-1,3) from their aqueous dispersions without the addition of any foreign substances, such as acids, salts, or alcohols, which add to the materials' cost and are sometimes difficult to remove and which contaminate the emulsifying agent to such an extent that usually it is not economical to recover it. Furthermore, the process of this invention differs from all previously described methods of freezing coagulation in that it produces the coagulated rubber-like material at a rapid rate and in a form, such as a thin sheet or thread, etc., which is particularly suitable for subsequent rapid washing and drying. These thin sheet or threads, etc. may as a matter of fact be washed either before or after passing through squeeze rolls, preferably the former, merely by passing them through sprays and/or into suitable baths as indicated above, and this, in itself, is a very valuable property.

Particular advantage accrues from the continuous modification of the invention. A thin, porous film or thread may be formed continuously by the process of this invention much more readily than by any other known method. For example, the continuous film obtainable by the method described in Example IV can be processed in the form in which it is obtained with minimum difficulties.

In cases where the rubber-like coagulum is inherently plastic, as are all the materials produced in the above examples with the exception of Example III (b), it may be used, after removal of the serum and drying, very much like natural, unvulcanized rubber. These uses are fully described as regards polymerized halogen substituted dienes in copending applications, identified above, for example, the Starkweather application, Serial No. 69,739, filed March 19, 1936, which is mentioned in Example II.

This method for coagulating in shapes, having at least one very small dimension, may also be used to advantage in the manufacture of sheets, bands, threads, and thin-walled articles. For making bands and sheets, a continuous layer of synthetic rubber, coagulated, freed from serum, and dried, as described in Example IV, is cut to the desired size. For making hollow, thin-walled articles, a layer of latex is coagulated upon a suitably shaped and internally cooled mold as in Examples I, II and III. The mold is then warmed to melt the ice, the coagulum is freed from serum either by washing or application of pressure, dried and removed from the mold.

If only gentle pressure is applied to any of the fresh coagula, obtained as above, the finished article made from the coagulum retains a valuable porous structure, arising from the presence of ice crystals. Alternatively a compact structure may be obtained by applying greater pressure to the fresh coagulum.

A latex made without modifying agent, such as the one used in Example III (b), is particularly suitable for making articles of the types described, since it gives an elastic, non-plastic, insoluble rubber-like material directly, without a curing or vulcanizing step. Alternatively, the latices containing plastic types of polymer may be treated, before coagulation, with substances designed to accelerate curing, such as zinc oxide in the case of latices made from chloroprene. The resulting compounded latex is then coagulated and further treated as already described and finally cured or vulcanized.

It is apparent that many widely different embodiments of this invention may be made without departing from the spirit and scope thereof and, therefore, it is not intended to be limited except as indicated in the appended claims.

We claim:

1. In a process involving coagulation of an aqueous dispersion of a halogen-2-butadiene-1,3 polymer, the steps which comprise rapidly freezing said dispersion in a mass at least one dimension of which is less than about 0.1 inch and maintaining the mass below the freezing temperature of the dispersion until coagulation is complete.

2. In a process involving coagulation of an aqueous dispersion of a chloro-2-butadiene-1,3 polymer, the steps which comprise rapidly freezing said dispersion in a mass at least one dimension of which is less than about 0.1 inch and maintaining the mass below the freezing temperature of the dispersion until coagulation is complete.

3. In a process involving the coagulation of an aqueous dispersion of a solid polymer of chloro-2-butadiene-1,3, the steps which comprise bringing a freezing surface into contact with a body of the dispersion until a thin layer is formed on the freezing surface and then removing the freezing surface with the frozen layer on it from contact with the body of dispersion and thereafter retaining the frozen layer in contact with the freezing surface.

4. The process which comprises continuously moving a surface cooled to a temperature below about −5° C. into and out of contact with a body of an aqueous dispersion of a rubber-like polymer of chloro-2-butadiene-1,3 at such a rate that the surface has a thin layer of frozen dispersion upon it as it leaves the body of the dispersion, retaining the thin layer in contact with the cooled surface until coagulation is complete, and thereafter removing the thin layer from contact with the cooled surface, thawing to melt the ice and washing and drying the thin layer of coagulum which results.

HOWARD WARNER STARKWEATHER.
WILLIAM STANSFIELD CALCOTT.